(12) United States Patent
Chee et al.

(10) Patent No.: US 6,199,990 B1
(45) Date of Patent: Mar. 13, 2001

(54) ROTATABLE MIRROR ASSEMBLY FOR OPTICAL PATH REVERSAL IN A LASER SCANNING MACHINE

(75) Inventors: Christopher Gregory Chee, Lexington, KY (US); Susan Marie Moore, Freedom, NY (US); Earl Dawson Ward, II, Richmond, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 09/588,191

(22) Filed: Jun. 6, 2000

(51) Int. Cl.[7] .................................................. G02B 5/08
(52) U.S. Cl. ..................... 359/850; 359/851; 359/852; 359/853; 359/854; 359/855; 359/877
(58) Field of Search ................................ 359/850, 851, 359/852, 853, 854, 855, 877

(56) References Cited

U.S. PATENT DOCUMENTS

| 4,266,847 | * | 5/1981 | Menke | ................................... | 359/872 |
| 5,341,207 | * | 8/1994 | Tank et al. | ............................ | 356/346 |

* cited by examiner

Primary Examiner—Mohammad Sikder
(74) Attorney, Agent, or Firm—Michael T. Sanderson

(57) ABSTRACT

A method of reversing a laser beam in a machine includes orienting a pair of reflective surfaces at an angle of approximately 90° relative to each other. The laser beam is directed in a first direction such that the laser beam sequentially impinges upon a first of the reflective surfaces reflects off of the first reflective surface, impinges upon a second of the reflective surfaces, and reflects off of the second reflective surface in a second direction substantially parallel to and opposite the first direction. A pivot axis is substantially parallel to each of the reflective surfaces. Each of the reflective surfaces is pivoted about the pivot axis by a substantially equal angle to thereby change a position of the laser beam after reflecting off of the second reflective surface.

13 Claims, 5 Drawing Sheets

ROTATABLE MIRROR ASSEMBLY FOR OPTICAL PATH REVERSAL IN A LASER SCANNING MACHINE

BACKGROUND OF THE INVENTION

1. Field of the Invention

The present invention relates to mirror assemblies in a laser scanning machine, and, more particularly, to mirror assemblies for optical path reversal in an electrophotographic machine.

2. Description of the Related Art

In order to provide a color electrophotographic printer with a same printing speed as a monochrome electrophotographic printer, it is known to substantially simultaneously produce the images on each respective electrophotographic drum for each of the colors of the printer. This is known as "tandem color laser electrophotographic architecture" and requires four laser print image lines to be respectively generated by cyan, magenta, yellow and black printheads, all of which must be packaged in a reasonably sized machine housing.

In order to minimize the size of a tandem color laser printer system, a compact laser printhead is required. Meeting this compactness objective requires folding the optical path back over top (or under) the mirror motor. To accomplish this, a 180° reversal of the optical path is achieved by a set of mirrors mounted as a pair, which are oriented at an angle of approximately 90° relative to each other. This 90° mirror set is located between the scanning polygon mirror and the first f-theta lens. In order to avoid undesirable bow and spot distortions occurring at the image plane, it is critical that the scanned laser beam pass through the desired optical axis of each lens. Thus, extreme care must be taken to physically align the source of the laser beam and/or the lens such that the scanned laser beam passes through the desired optical axis of the lens. Further, the laser beam and/or the lens must be provided with a shiftable mounting in order to perform such alignment.

What is needed in the art is a method of reversing a laser beam between a scanning mirror and a lens in an electrophotographic machine Such that a physical alignment procedure does not need to be performed on the source of the laser beam and/or the lens.

SUMMARY OF THE INVENTION

The present invention provides a method of reversing a laser beam and aligning the reversed laser beam with the optical axis of a lens without having to physically align either the source of the laser beam or the lens.

The invention comprises, in one form thereof, a method of reversing a laser beam in a machine. A pair of reflective surfaces are oriented at an angle of approximately 90° relative to each other. The laser beam is directed in a first direction such that the laser beam sequentially impinges upon a first of the reflective surfaces, reflects off of the first reflective surface, impinges upon a second of the reflective surfaces, and reflects off of the second reflective surface in a second direction substantially parallel to and opposite the first direction. A pivot axis is substantially parallel to each of the reflective surfaces. Each of the reflective surfaces is pivoted about the pivot axis by a substantially equal angle to thereby change a position of the laser beam after reflecting off of the second reflective surface.

An advantage of the present invention is that the laser beam can be aligned with the optical axis of a lens without having to physically align either the source of the laser beam or the lens.

Another advantage is that the alignment procedure can be performed quickly, resulting in minimal assembly time.

Yet another advantage is that only minimal changes occur in the length of the optical path, and hence, no translation of the reversing mirrors is required.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 1:
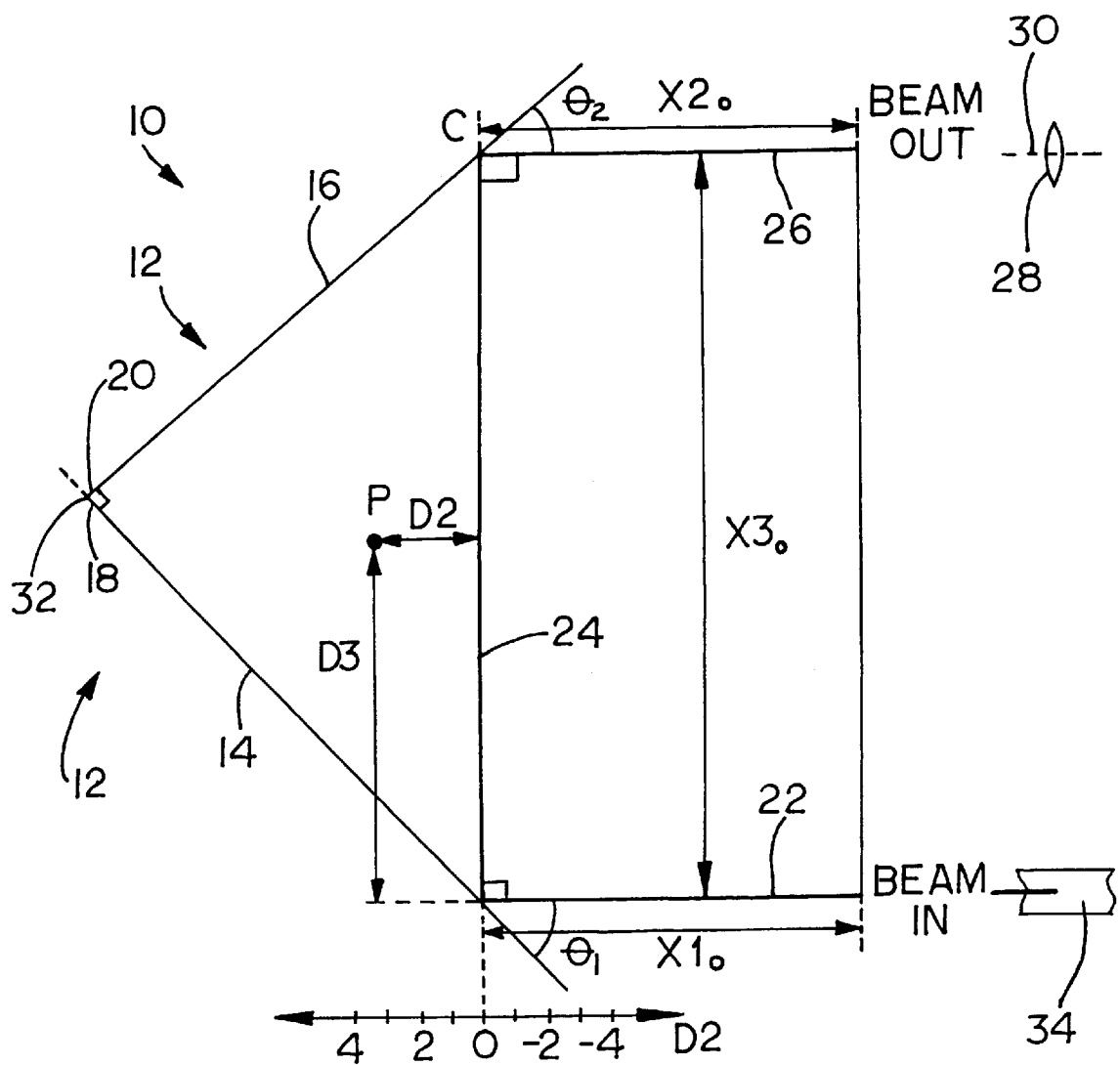
FIG. 1 is a schematic, side view of one embodiment of a pivotable mirror assembly of the present invention in an unrotated position.

Referring now to the drawings, and, more particularly, to FIG. 1, there is shown one embodiment of a rotatable mirror assembly 10 of the present invention. Mirror assembly 10 includes a mirror set 12 in the form of a pair of planar mirrors 14 and 16 which are fixedly mounted relative to one another at a substantially right (90°) angle at respective projected edges 18 and 20 which intersect at line 32. An incoming laser beam 22 reflects off of mirror 14 as indicated at 24, and then reflects off of mirror 16 as an outgoing laser beam 26. Outgoing laser beam 26 is directed toward a stationary lens 28 having an optical axis 30. Incoming laser beam 22 forms a 45° angle $\theta_1$ with mirror 14, and outgoing laser beam 26 forms a 45° angle $\theta_2$ with mirror 16. This will be referred to herein as the "unrotated position" of mirror set 12.

To insure that outgoing laser beam 26 is coincident with optical axis 30 of the lens 28 in the presence of real parts tolerances, the 90° mirror set 12 is rotated about a pivot axis P that is parallel to a line of intersection 32 of projected edges 18, 20 of the two mirrors 14, 16. That is, mirror set 12 is pivotable in directions parallel to the plane of the page about pivot axis P. The rotation of mirror set 12 about pivot axis P causes a distance X3 between incoming beam 22 and outgoing beam 26 to increase or decrease (depending upon the direction of rotation) to achieve the desired adjustment. $X3_o$ is defined as the value of X3 in the unrotated position of FIG. 1 wherein incoming beam 22 and outgoing beam 26 are oriented at 45° angles relative to mirror 14 and 16, respectively. In the particular preferred embodiment presented in FIG. 4, $X3_o$ is 13.9 mm, but the invention is general for any value of X3. The 90° angle between mirrors 14, 16 insures that the incoming beam 22 and the outgoing beam 26 remain parallel to each other throughout the rotation of mirror set 12.

Since the 90° mirror set 12 is located between a scanning polygon mirror and the first f-theta lens 28, the optical path length between a surface 34 of the polygon mirror and the surface of first f-theta lens 28 is critical to the performance of the optical system. Unfortunately, the optical path length from the scanning polygon surface 34 to the surface of first lens 28 can also increase or decrease due to this rotation of the 90° mirror set 12. This change in optical path length can cause undesirable changes in the optical performance of the system.

In the unrotated embodiment of FIG. 1, the pivot axis P of the 90° mirror set 12 is placed at a general location, wherein D2 is a normalized distance from reflected beam 24 to pivot axis P in a direction parallel to both incoming beam 22 and outgoing beam 26, and D3 is a distance from incoming beam 22 in a direction perpendicular to both beams 22 and 26.

Figure 2:
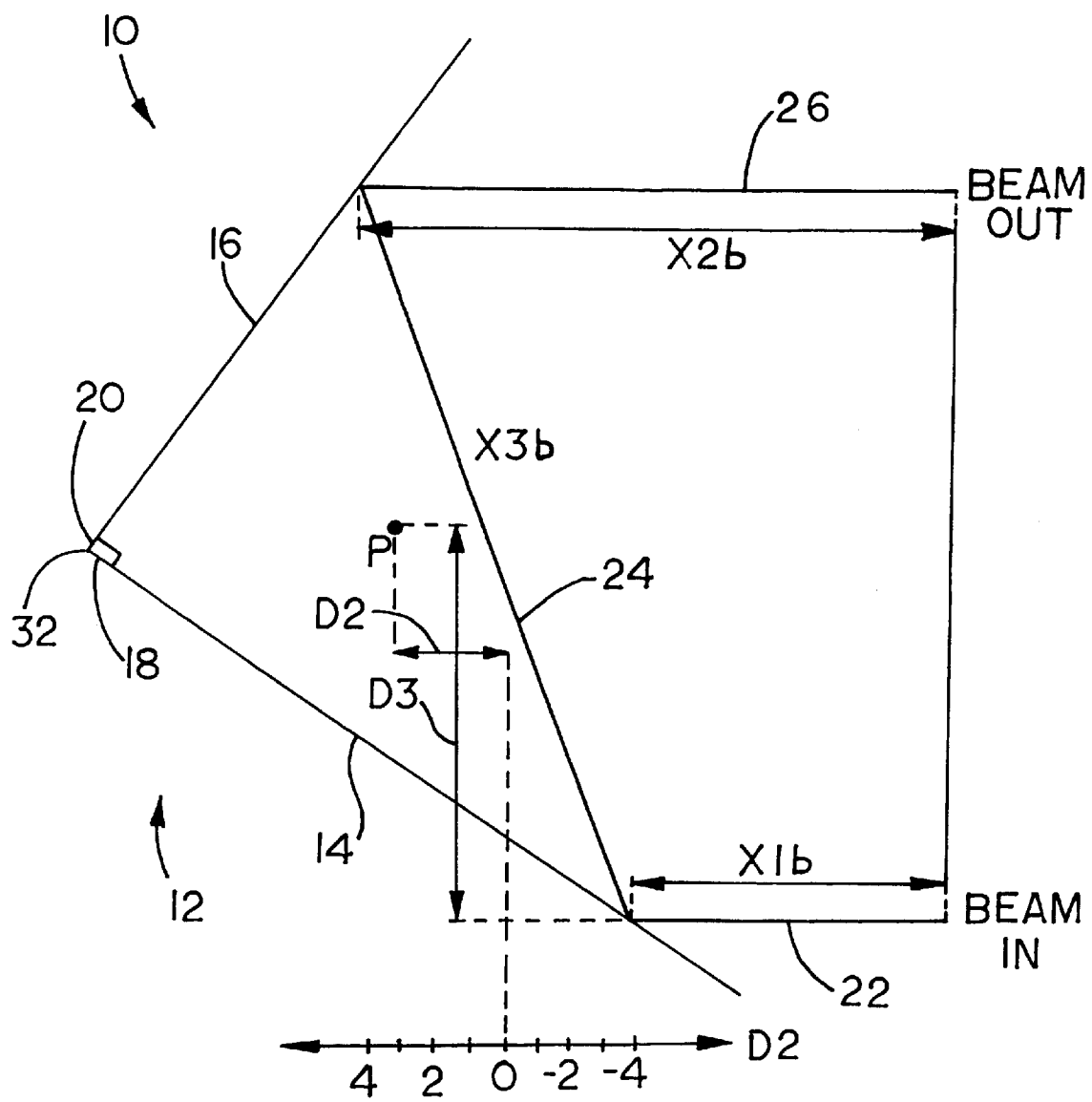
FIG. 2 is a schematic, side view of the pivotable mirror assembly of FIG. 1 in a rotated position.

When mirror set 12 is in a rotated position (FIG. 2). pivot axis P is at the same location as in FIG. 1, but mirror set 12 has been rotated in a counterclockwise direction about pivot axis P such that incoming beam 22 is oriented at an angle of less than 45° relative to mirror 14, and outgoing beam 26 is oriented at an angle of greater than 45° relative to mirror 16.

Figure 3:
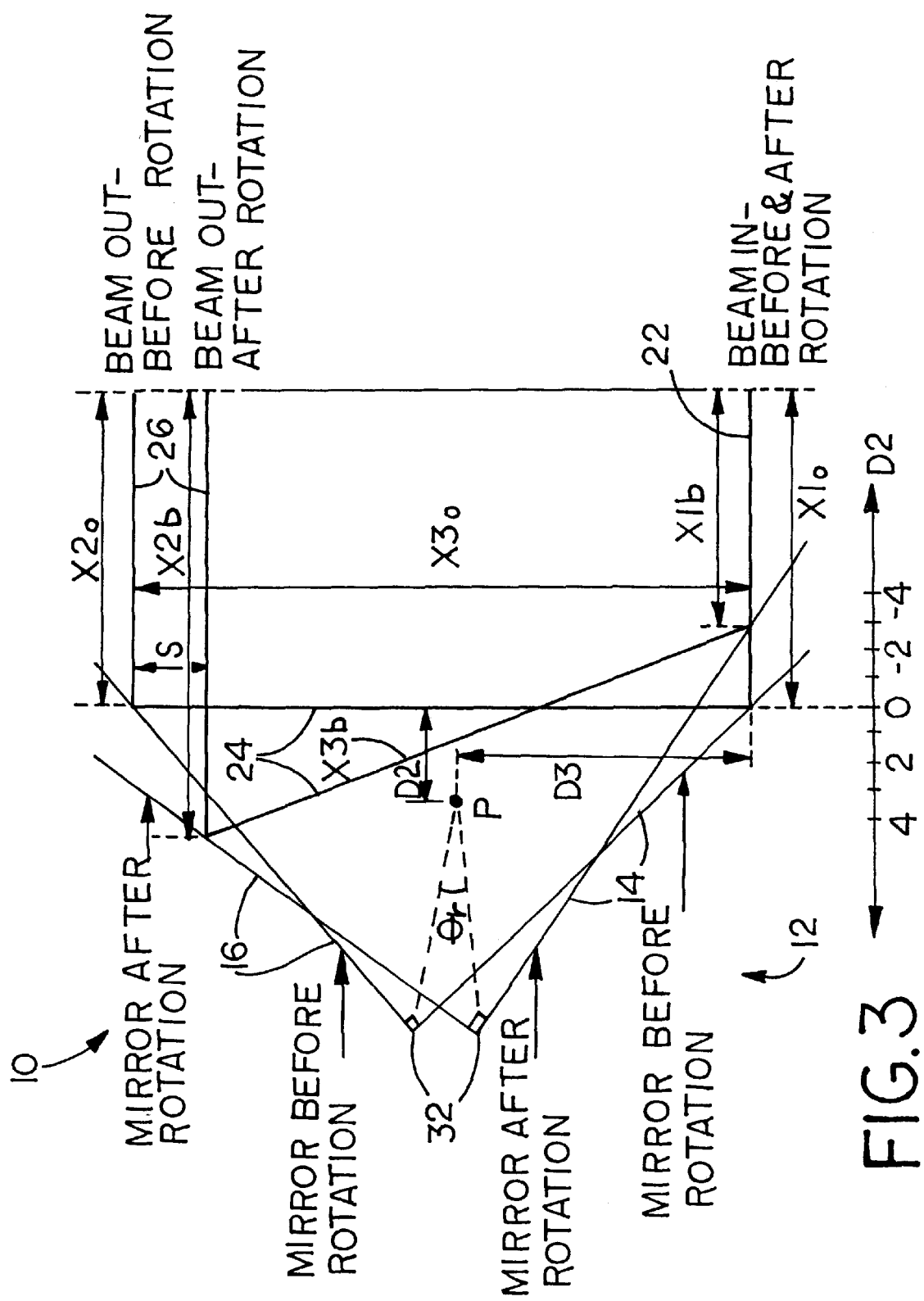
FIG. 3 is a schematic, side view of the superposition of the two different positions of the pivotable mirror assembly of FIGS. 1 and 2.

FIG. 3 shows a comparison of the optical paths of the laser beam before and after rotation of mirror set 12 through an angle $\theta_r$. That is, FIG. 3 shows the optical paths of the laser beam both when mirror set 12 is in the rotated position of FIG. 2 and when mirror set 12 is in the unrotated position of FIG. 1 wherein incoming beam 22 forms a 45° angle with mirror 14. In general, the optical path length before rotation $(X1_o + X3_o + X2_o)$ is not equal to the optical path length after rotation $(X1b + X3b + X2b)$. Which optical path is longer depends upon the location of pivot axis P as well as the degree and direction of rotation of mirror set 12.

Figure 4:
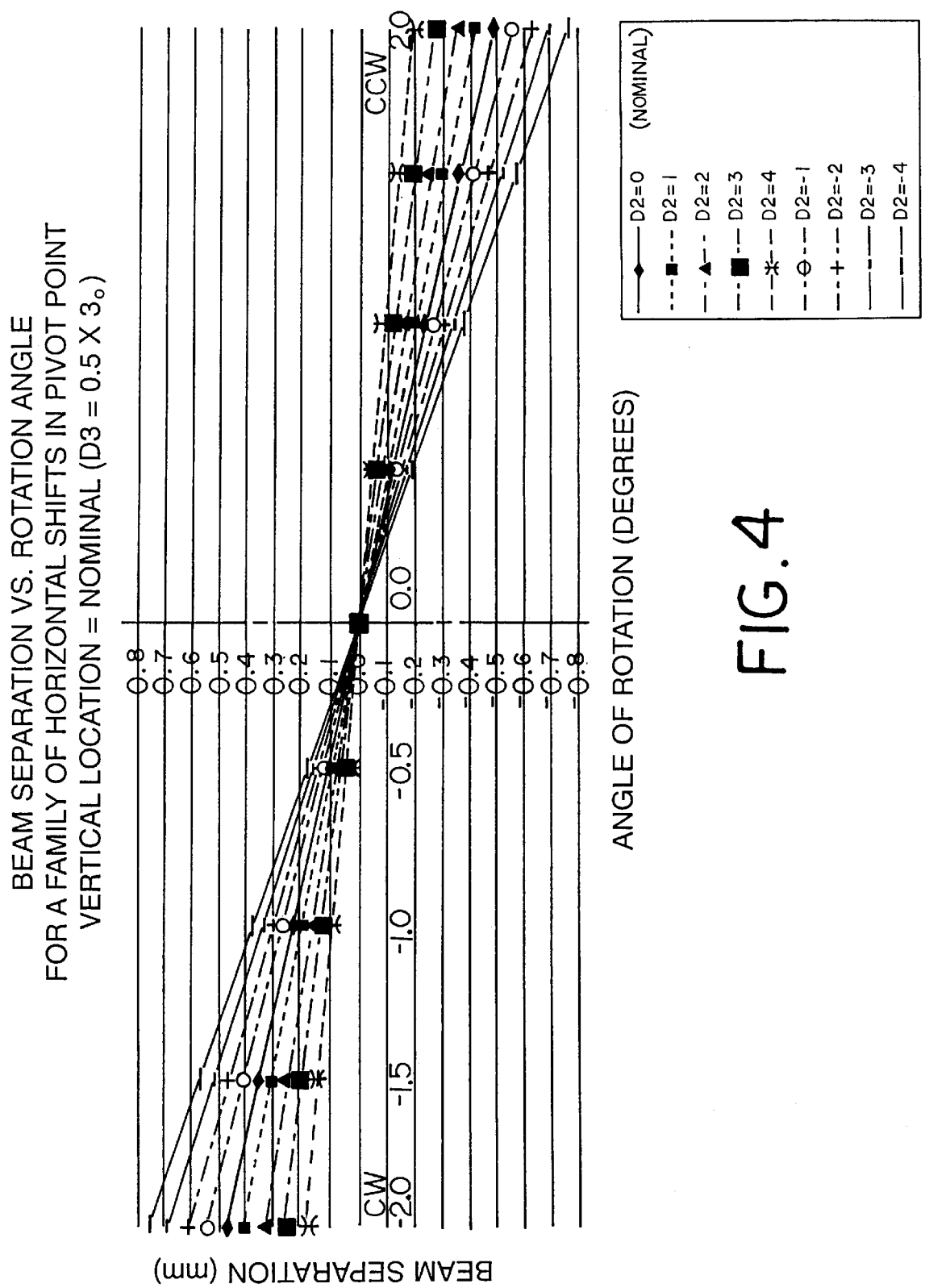
FIG. 4 is a plot of beam separation versus the angle of rotation of the mirror assembly of the present invention for various positions of the pivot axis.

A beam separation distance S is defined in FIG. 3 as a distance between a current position of outgoing beam 26 and the position of outgoing beam 26 before rotation, i.e., in the unrotated position. FIG. 4 is a plot of beam separation distance S versus the angle of rotation of mirror set 12 for various positions of pivot axis P. As can be determined from FIG. 4, the change in beam separation S becomes greater for a given change in angle of rotation $\theta_r$ of mirror set 12 as D2 decreases. In other words, beam separation S per degree of rotation of $\theta_r$ becomes greater as pivot axis P is moved further from the junction 32 of mirror set 12, i.e., to the right in FIGS. 1–3. A counterclockwise (CCW) rotation of angle $\theta_r$, as shown in FIG. 3, causes a decrease in separation distance S as defined in FIG. 4. Likewise, a clockwise (CW) rotation of angle $\theta_r$ causes an increase in separation distance S.

In assembly of the printhead in which rotatable mirror assembly 10 is placed, the adjustment of beam separation distance S may require a less sensitive gain between angle of rotation $\theta_r$ of mirror set 12 and the change in distance of separation S between the two outgoing beams 26. In this case, moving pivot axis P toward the junction 32 of the two mirrors 14, 16, i.e., to the left in FIGS. 1–3, results in a positive increase in D2 and a lower gain. That is, movement of pivot axis P toward junction 32 results in a larger angle of rotation $\theta_r$ being required to achieve the same beam separation distance S. This is can also be determined from FIG. 4.

Figure 5:
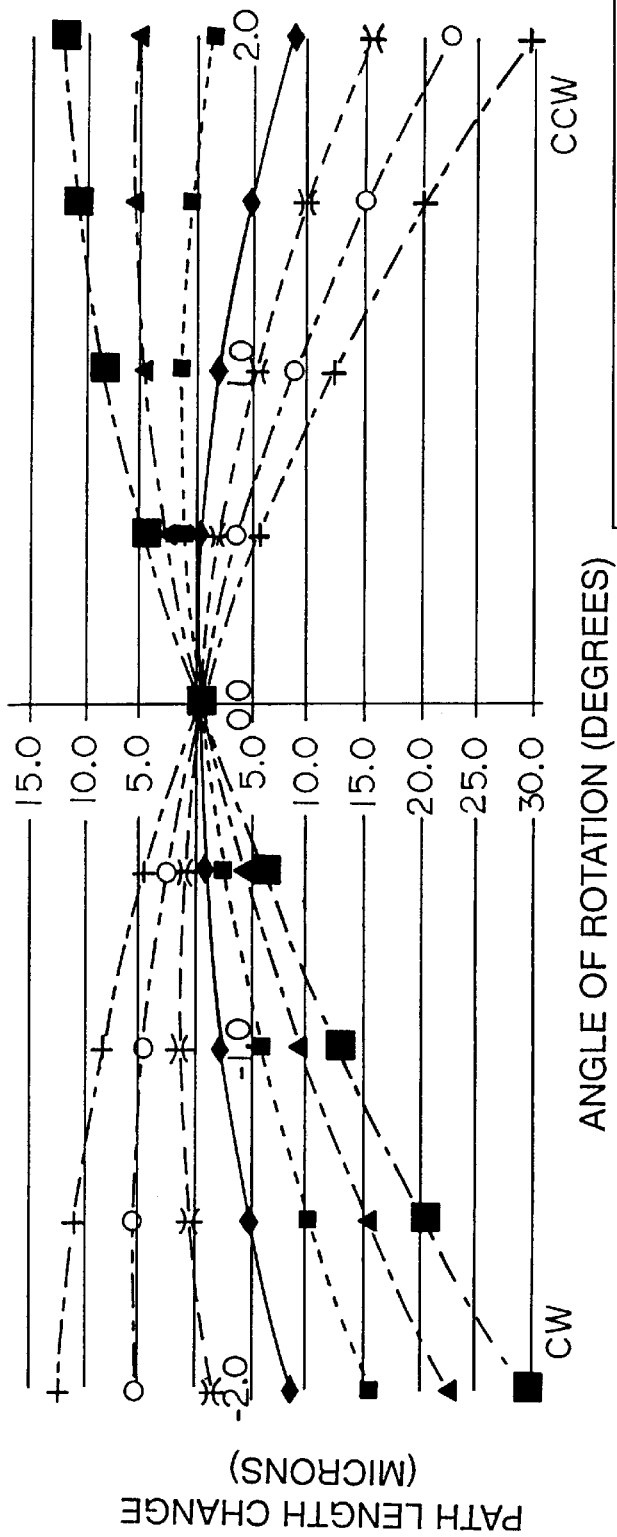
FIG. 5 is a plot of the change in optical path length versus the angle of rotation of the mirror assembly of the present invention for various positions of the pivot axis.

FIG. 5 shows the relationship between the change in optical path length of the laser beam and angle of rotation $\theta_r$ of mirror set 12 for various locations, D3, of pivot axis P. It has been found that changes in the "horizontal" position, D2, of pivot axis P parallel to incoming beam 22 and outgoing beam 26 causes less than 0.1 micron change in path length over the same +/−2° rotation of mirror set 12, but, as shown in FIG. 4, changing D2 does linearly affect beam separation S. In contrast, changing the location of the pivot "vertically" (perpendicular to incoming beam 22 and outgoing beam 26), D3, does impact the change in path length as shown in FIG. 5, but causes a change of less than one micron in beam separation distance S. In conclusion, changing the pivot location by changing D2 affects beam separation S, but does not substantially affect the path length. Changing D3 affects the path length, but does not substantially affect beam separation S. From FIG. 5 it can be seen that locating the pivot axis in the center of the unrotated beam 24 location (D2=0, D3=$X3_o$/2) results in less than 10 microns of path length change over 2° of rotation and less than 30 microns of path length change if a worst case error in the location of pivot axis P occurs. Thus, there is no need to translate the 90° mirror set 12 in a direction parallel to incoming beam 22 and outgoing beam 26 in order to correct for path length change after mirror set 12 has been rotated to achieve the desired beam separation S. Such rotation of mirror set 12 is needed to adjust the location of outgoing beam 26 to compensate for the tolerances of the particular set of components that make up a particular printhead.

If a lower gain position of D2 is chosen, i.e., pivot axis P is located closer to junction 32, a trade-off must be made because, as is shown in FIG. 4, a larger angle of rotation $\theta_r$ is needed to achieve the same required change in beam separation S. As is shown in FIG. 5, a larger range of change of angle $\theta_r$ to achieve a desired change in beam separation S increases the undesired change in optical path length. The model presented here (as shown in FIGS. 4 and 5) can be used to determine the appropriate location of pivot axis P to achieve an acceptable trade-off. For any value of D2 that is chosen, FIG. 5 shows that it is best to locate pivot axis P at $X3_o/2$ to maintain a minimal and symmetric path length change as a function of angular rotation $\theta_r$.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of reversing and aligning a laser beam in a machine, said machine having a lens, said method comprising the steps of:

provide a plurality of reflective surfaces;

orienting said reflective surfaces at at least one angle relative to each other;

directing the laser beam in a first direction such that the laser beam sequentially:
impinges upon a first of said reflective surfaces;
reflects off of said first reflective surface;
impinges upon a last of said reflective surfaces; and
reflects off of said last reflective surface in a second direction substantially parallel to and opposite said first direction, the laser beam having a position after reflecting off of said last reflective surface; and pivoting each of said reflective surfaces about a pivot axis by a substantially equal angle to thereby change the position of the laser beam after reflecting off of said last reflective surface to align said laser beam with an optical axis of said lens.

2. The method of claim 1, wherein said orienting step includes fixedly mounting said reflective surfaces relative to each other and relative to said pivot axis.

3. The method of claim 1, wherein said directing step includes reflecting the laser beam off of a surface of a polygon mirror.

4. The method of claim 1, wherein said plurality of reflective surfaces comprises a plurality of mirrors.

5. The method of claim 1, wherein each of said reflective surfaces face said pivot axis.

6. The method of claim 1, comprising the further step of choosing a location of said pivot axis such that the position of the laser beam after reflecting off of said last reflective surface changes by a desired distance per degree of pivoting of said reflective surfaces.

7. The method of claim 1, wherein the laser beam has an optical path with a length, said method comprising the further step of choosing a location of said pivot axis that minimizes a change in the length of the optical path per degree of pivoting of said reflective surfaces.

8. The method of claim 1, comprising the further step of choosing a location of said pivot axis such that an optimal trade-off is realized between a size of a change in the position of the laser beam per degree of pivoting of said reflective surfaces and a change in a length of an optical path of the laser beam per degree of pivoting of said reflective surfaces.

9. The method of claim 1, wherein said pivot axis is substantially parallel to each of said reflective surfaces.

10. The method of claim 1, wherein said plurality of reflective surfaces comprises a pair of reflective surfaces oriented at an angle of approximately 90° relative to each other.

11. A method of reversing and aligning a laser beam in a machine, said method comprising the steps of:

providing a plurality of reflective surfaces;

orienting said reflective surfaces at at least one angle relative to each other;

providing a lens having an optical axis;

directing the laser beam in a first direction such that the laser beam sequentially:

impinges upon a first of said reflective surfaces;

reflects off of said first reflective surface;

impinges upon a last of said reflective surfaces;

reflects off of said last reflective surface in a second direction substantially parallel to and opposite said first direction; and impinges upon said lens;

providing a pivot axis substantially parallel to each of said reflective surfaces; and pivoting each of said reflective surfaces about said pivot axis by a substantially equal angle to thereby cause the laser beam to be substantially coincident with said optical axis of said lens after reflecting off of said last reflective surface.

12. The method of claim 11, wherein said lens is substantially stationary.

13. The method of claim 11, wherein said plurality of reflective surfaces comprises a pair of reflective surfaces oriented at an angle of approximately 90° relative to each other.

* * * * *